Sept. 19, 1933.   L. MIDDLEDITCH   1,927,131
CALENDAR
Filed Dec. 16, 1931   3 Sheets-Sheet 1
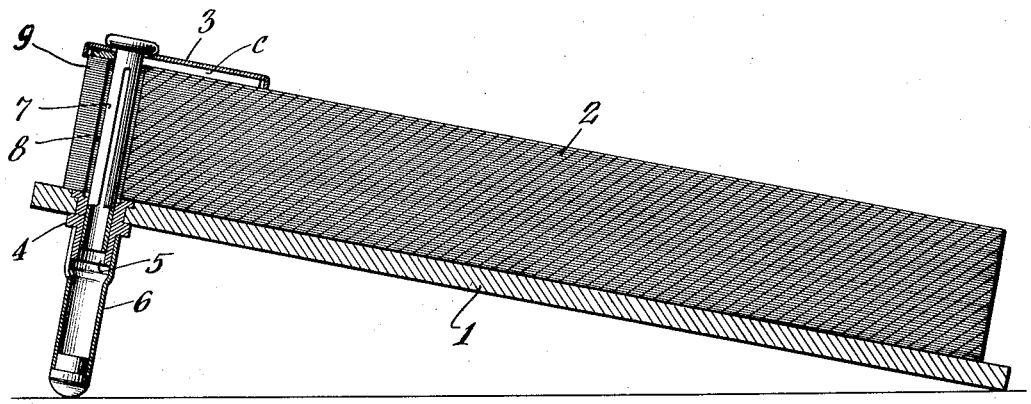
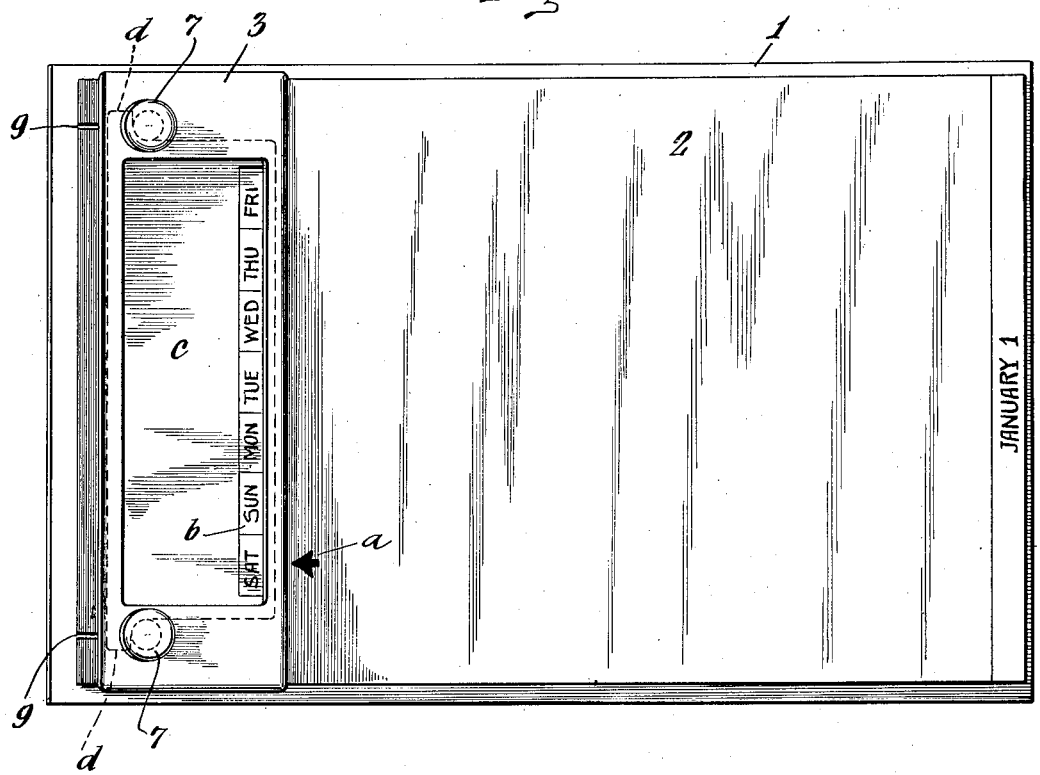
INVENTOR
Lyman Middleditch
BY
ATTORNEY Sept. 19, 1933.   L. MIDDLEDITCH   1,927,131
CALENDAR
Filed Dec. 16, 1931   3 Sheets-Sheet 2
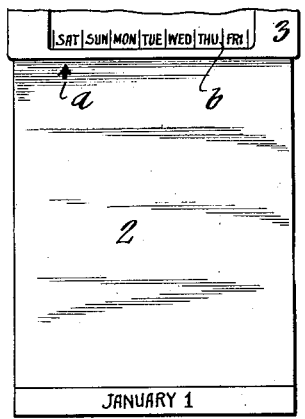
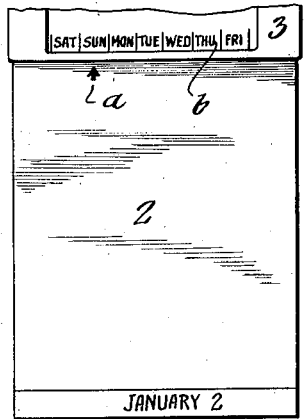
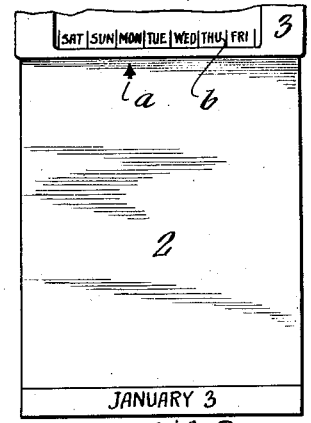
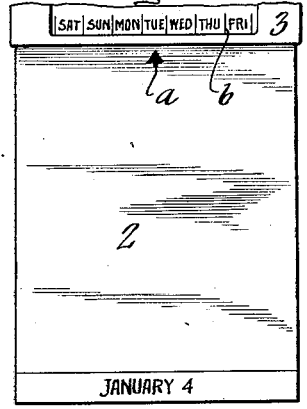
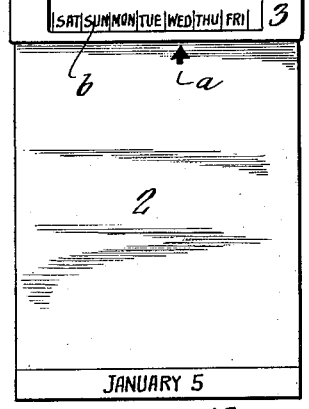
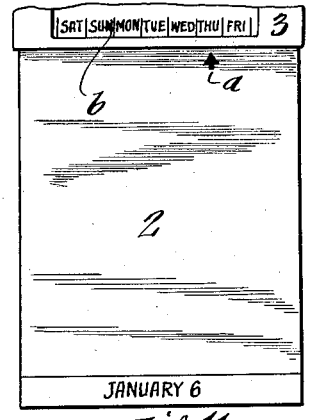
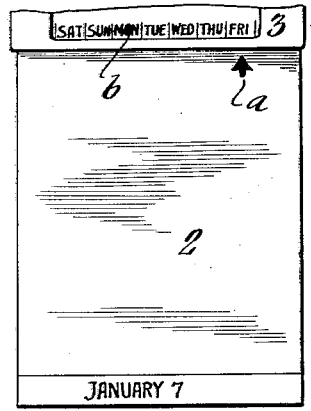
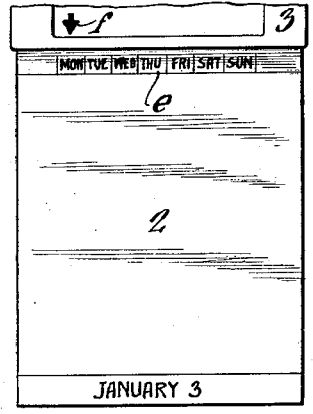
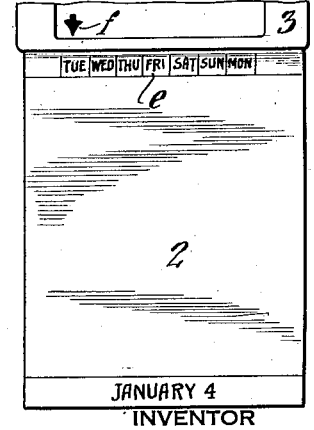
INVENTOR
Lyman Middleditch
BY
ATTORNEY Sept. 19, 1933.    L. MIDDLEDITCH    1,927,131
CALENDAR
Filed Dec. 16, 1931    3 Sheets-Sheet 3
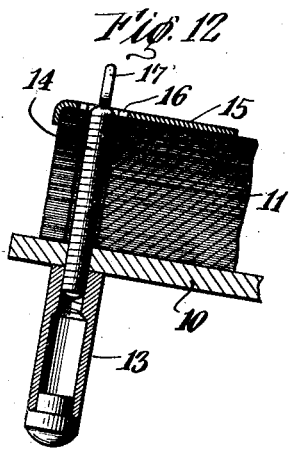
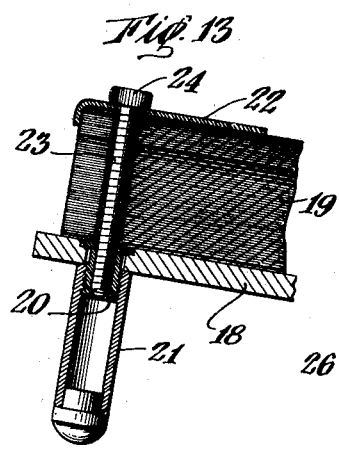
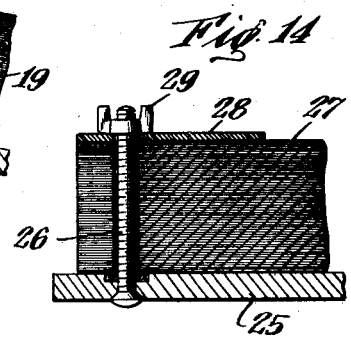
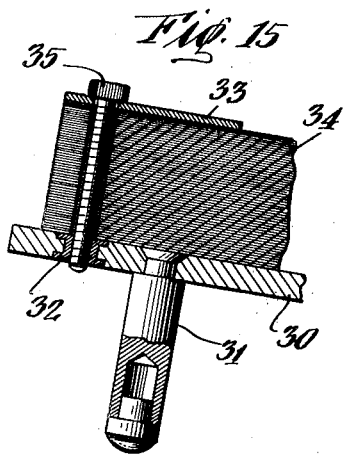
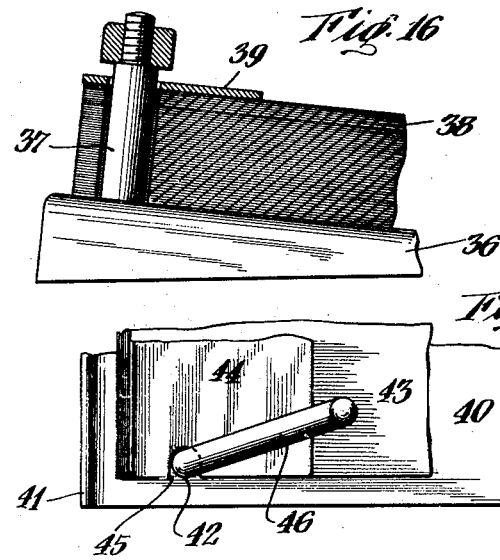
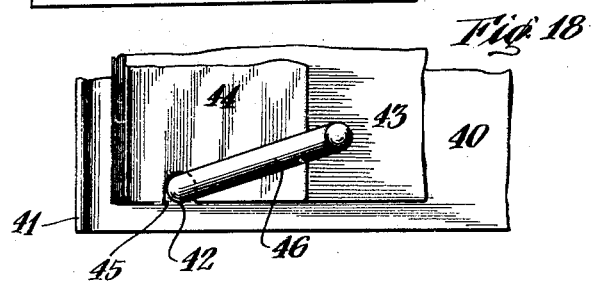
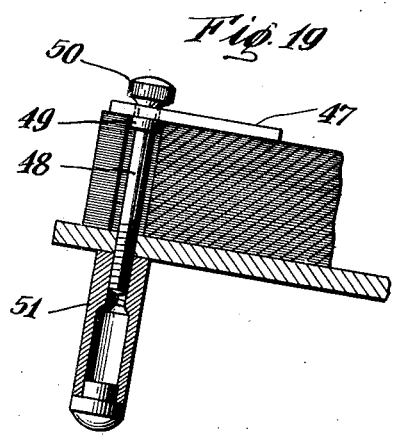
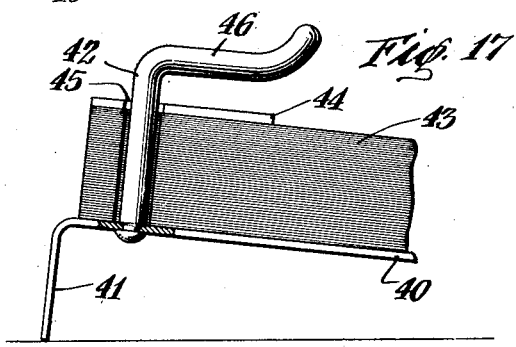
INVENTOR
Lyman Middleditch
BY
ATTORNEY Patented Sept. 19, 1933

1,927,131

UNITED STATES PATENT OFFICE 1,927,131

CALENDAR

Lyman Middleditch, New York, N. Y.

Application December 16, 1931
Serial No. 581,313

2 Claims. (Cl. 40—120)

The present invention relates to calendars and particularly of the type that employs a pack of sheets, whether bound or loose-leaf that are removable independently of one another.

The main object and feature of the invention is the production of a calendar composed of a pack of sheets and an indicator which together give the date and day of the week, the said indicator being adjustable as the height of the pack diminishes so that the eye will always travel readily from one to the other, and said sheets being capable of use in any one of several years so that no loss can result to the dealer from overstocking.

In the accompanying drawings the invention is disclosed in several concrete and preferred forms in which:

Fig. 1 is a vertical sectional view of a calendar embodying one form of the invention;

Fig. 2 is a top plan view of Fig. 1, looking in the direction of arrow 2 of Fig. 1;

Figs. 3 to 11 inclusive are fragmentary views illustrating the relationship between the sheets and the indicator;

Figs. 12 to 16 inclusive are views similar to Fig. 1, but illustrating modified forms of the invention;

Fig. 17 is a fragmentary view in side elevation illustrating still another form of the invention:

Fig. 18 is a fragmentary top plan view of the parts shown in Fig. 17; and

Fig. 19 is a view similar to Fig. 1 illustrating yet another form of the invention.

In the construction shown in Figs. 1 and 2, the calendar consists of a base or support 1 for a pack of superimposed sheets 2, capable of use in any one of several years, said sheets being removable independently of one another whereby the height of the pack is gradually diminished. 3 is the indicator above the pack of sheets. In the present instance, support 1 is provided with hollow bushings 4 clamped to opposite faces of the support and each having a downward projection 5 extending from the lower face of the support. Hollow legs as 6 are carried by the exterior of the bushing so as to sustain the support in an inclined position, and posts as 7 are frictionally engaged within the hollow bushings and extend upwardly from the support and, in this case, pass through perforations 8 in the sheets. The sheets, in addition to being perforated, have slots 9 that extend from said perforations to the back edge of the sheets so that the sheets can be readily pulled out after the fashion of loose-leaf assemblies. Indicator 3 is here loose on the posts, being perforated in a manner similar to the sheets, so that, as the latter are withdrawn and the height of the pack diminishes, said indicator will follow the diminishing pack of sheets and will always lie closely adjacent the top sheet so that the eye can readily travel from one to the other. Posts 7 are adjustable within bushing 4, as will be understood, so that even if the indicator was not loosely but rigidly mounted on the posts, said indicator would be adjusted when the posts are pressed more deeply into the hollow bushings and legs.

The means whereby the sheets and the indicator together give the date and day of the week may vary. As shown in Figs. 1 to 9, each sheet carries the date of the month, such as January 1 etc. and, in addition thereto, an indication, such as arrow $a$, devoid of significance in itself but which when associated with the indicator gives the day of the week. The indicator exhibits a sequence of days of the week $b$ as shown, so that, once it has been ascertained what day of the week the first of January (or any other date that may be selected) falls on, the same indicator will serve throughout the year, except in leap years when the sequence of days of the week will have to be changed again either on the twenty-ninth of February or on the first of March, as will be understood. Indication $a$ on the sheets occurs at successively shifted positions, as will be seen in Figs. 3 to 9, so that the arrow always points to the correct day of the week exhibited by the indicator, and this successively shifted position occurs in groups of seven sheets, each group of sheets repeating the positions of that of the preceding group, except in leap years when two successive sheets have the indication mark in the same position because the sequence of days of the week is advanced one day. The indicator here consists of an open frame loosely carried by the posts, beneath which frame is placed a card $c$ showing the sequence of days of the week, said card being removably attached to the frame itself or lying loosely beneath it, and being to that end provided with suitable post-engaging means such as extensions $d$. It will therefore be seen that sheets 2 can be withdrawn without displacement of card $c$. If desired, a full complement of seven cards can be carried by the frame, each card exhibiting a different sequence of days of the week, the card in use being uppermost. It will therefore be seen that a pack of sheets printed with the date and an indication that is devoid of significance in itself, can be used in any year without loss to the dealer, it being only necessary to change the indicator exhibiting the days of the week, and that in addition, the eye is readily guided to the correct day of the week no matter how much the pack of sheets diminishes in height. It will be obvious that an arrangement the reverse of that just described may be used. As shown in Figs. 10 and 11, each sheet may carry the date of the month as before, and the indication that is devoid of significance in itself may consist of a sequence of days of the week e, the sequence varying by one day, from day to day, and running in groups of seven, the same sequence of days of the week appearing on every seventh sheet, except in leap year when an extra sheet is introduced carrying the same sequence as that of the preceding week. When this system is used the indicator may carry an arrow as f, which indicator remains in the same position throughout the year, except in leap year when it is shifted to a new position by placing another card in position as will be understood.

In Fig. 12 is shown a modified form of the invention, in which support 10 carries a pack of sheets 11, and 13 is one of two legs that are held in position by screws or posts such as 14 which latter pass through the pack of sheets and also through the support into threaded and therefore adjustable engagement with the legs. 15 is the indicator provided with slots 16 through which heads 17 of the screws pass, and which heads when turned crosswise of the slots hold the parts together. The indicator may here serve as a tear-plate for the sheets, and the remaining stubs of the slots may be removed every few days or, if desired, the sheets may be completely withdrawn from day to day. Screws 14 are brought deeper and deeper into the hollow legs as the pack of sheets diminishes by turning said screws.

In Fig. 13, support 18 for the pack of sheets 19 is provided with hollow bushings 20 that extend below the under-surface of the support where they carry hollow legs 21. 22 is the indicator through which loosely pass screws or posts 23 that are in threaded engagement with the interior of the bushing. It will be seen that the indicator is here self-adjusting as the pack diminishes in height, and also that screws or posts 23 can be brought further and further into the hollow legs by turning knob 24 attached to said screws.

In Fig. 14, support 25 occupies a horizontal position and is provided with screws or posts 26 anchored on said support and extending up through the pack of sheets indicated at 27. 28 denotes the indicator loosely mounted on the posts, above which indicator are adjustable wing nuts 29.

In Fig. 15, support 30 carries legs 31 to maintain it in an inclined position, and said support is further provided with bushings 32. 33 is the indicator resting on top of the pack of sheets 34, and 35 are screws or posts passing loosely through the indicator and sheets and having threaded engagement with bushings 32.

In Fig. 16, support 36 is itself inclined and carries posts 37 that extend up through the pack of sheets 38. 39 is the indicator mounted loosely on posts 37.

In Figs. 17 and 18 is shown a support 40 elevated at one end as by means of bent extensions 41. 42 indicate two posts one at either side edge of the sheets 43. 44 is the indicator, and this, as well as the sheets, have notches or cut-out portions 45 in its side edges. Posts 42 are swiveled in support 40 and have extensions 46 that may be adjusted to overlie the indicator and sheets or which may be swung out of the way.

In Fig. 19 is shown a still further modified form of the invention in which indicator 47 is not slidable on posts 48, it being held between collar 49 and head 50. Nevertheless, said posts may be freely rotatable with respect to said indicator. It will therefore be seen that when posts 48 are adjusted with respect to a socket member 51, carried by the support for the sheets, either by rotating the posts (if threaded) or by depressing them (if frictionally held) said indicator will be adjusted to lie closely adjacent the pack of sheets.

It will, of course, be understood that in the forms of the invention shown in Figs. 12 to 19, the arrangement of indication marks explained in connection with Figs. 3 to 11 will be used.

I claim:

1. A calendar including: a pack of superimposed sheets, capable of use in any one of several years, said sheets being removable independently of one another whereby the height of the pack is gradually diminished, each sheet exhibiting a day of a month and having an indication, devoid of significance in itself, which when associated with an indicator denotes the day of the week; a support to sustain the pack of sheets; adjustable posts projecting from said support; and an indicator composed of an open frame and a removable card, which when associated with the indication on a sheet denotes the day of the week; said indicator carried by, and self-adjusting on, the posts above the pack and admitting of the withdrawal of the sheets without displacement of the card.

2. A calendar including: a pack of superimposed sheets, capable of use in any one of several years, said sheets being removable independently of one another whereby the height of the pack is gradually diminished, each sheet exhibiting a day of a month and having an indication, devoid of significance in itself, which when associated with an indicator denotes the day of the week; a support to sustain the pack of sheets; adjustable posts projecting from said support; and an indicator having a removable card which when associated with the indication on a sheet denotes the day of the week, said indicator carried by, and self-adjusting on, the posts above the pack and admitting of the withdrawal of the sheets without displacement of the card.

LYMAN MIDDLEDITCH.